United States Patent
Kwon

(10) Patent No.: US 7,967,304 B2
(45) Date of Patent: Jun. 28, 2011

(54) STEERING STOPPER UNIT FOR VEHICLE

(75) Inventor: Hyuck Jae Kwon, Seoul (KR)

(73) Assignee: Hyundai Motor Company, Seoul (KR)

( * ) Notice: Subject to any disclaimer, the term of this patent is extended or adjusted under 35 U.S.C. 154(b) by 176 days.

(21) Appl. No.: 12/498,865

(22) Filed: Jul. 7, 2009

(65) Prior Publication Data

US 2010/0007108 A1   Jan. 14, 2010

(30) Foreign Application Priority Data

Jul. 10, 2008   (KR) .................. 10-2008-0067166

(51) Int. Cl.
*B62D 7/18* (2006.01)

(52) U.S. Cl. ..................... 280/89; 280/93.512

(58) Field of Classification Search ............ 280/93.512, 280/89

See application file for complete search history.

(56) References Cited

U.S. PATENT DOCUMENTS

| | | | | |
|---|---|---|---|---|
| 1,924,586 A * | 8/1933 | Zerk | .................. | 280/93.512 |
| 5,026,080 A * | 6/1991 | Steffi et al. | ............... | 280/87.042 |
| 5,052,528 A * | 10/1991 | Sullivan | .................. | 188/317 |
| 5,340,142 A * | 8/1994 | Kuhns | .................. | 280/444 |
| 5,435,590 A * | 7/1995 | Larsson | .................. | 280/93.502 |
| 5,588,660 A * | 12/1996 | Paddison | .................. | 280/93.512 |
| 6,398,240 B1 * | 6/2002 | Taylor | .................. | 280/93.512 |
| 7,780,180 B2 * | 8/2010 | Hoepner et al. | ............. | 280/267 |
| 2005/0082780 A1 * | 4/2005 | Seeds et al. | .................. | 280/93.512 |

FOREIGN PATENT DOCUMENTS

| | | | |
|---|---|---|---|
| EP | 603734 A1 | * | 6/1994 |
| JP | 02102811 A | * | 4/1990 |
| JP | 2003-11843 A | | 1/2003 |

* cited by examiner

*Primary Examiner* — Paul N Dickson
*Assistant Examiner* — Nicole Verley
(74) *Attorney, Agent, or Firm* — Morgan, Lewis & Bockius LLP

(57) ABSTRACT

A steering stopper unit for vehicle includes a stopper that is disposed to a knuckle and a stopper bracket that corresponds to the stopper and is disposed to a lower arm that is rotatably connected with a lower portion of the knuckle, and includes a stopper plate, which is hingedly engaged with an end of the stopper bracket, selectively contacts a forward side or rearward side of the stopper bracket, and has a predetermined thickness.

9 Claims, 6 Drawing Sheets

STEERING STOPPER UNIT FOR VEHICLE

CROSS-REFERENCE TO RELATED APPLICATION

The present application claims priority to Korean Patent Application Number 10-2008-0067166 filed Jul. 10, 2008, the entire contents of which application is incorporated herein for all purposes by this reference.

BACKGROUND OF THE INVENTION

1. Field of the Invention

The present invention relates to a steering stopper unit for a vehicle. More particularly, the present invention relates to a steering stopper unit for a vehicle that may vary limited ranges of steering angle in order to prevent a snow chain from interfering with a suspension system.

2. Description of Related Art

Generally, a steering stopper unit is disposed for limiting ranges of steering angle of a front wheel.

In the steering stopper unit, as shown in FIG. 5 and FIG. 6, a protrusion 103 is formed to a knuckle 101 to which a forward wheel (not shown) is mounted and a stopper 105 is mounted to an inside end of the protrusion 103.

A stopper bracket 109, corresponding to the stopper 105, is mounted to a lower arm 107, which is rotatably connected with a lower portion of the knuckle 101.

Thus, the steering stopper unit may limit ranges of steering angle in order to prevent the steering system from interfering with the suspension system when turning the steering wheel.

However, in the conventional steering stopper unit, the stopper 105 and the stopper bracket 109 are respectively fixed to the knuckle 101 and the lower arm 107 so that the limit angle of the steering wheel is fixed to an initial state. Thus, when snow chains are mounted to a front wheel in the winter, the snow chain may interfere with the suspension system such as the lower arm 107, a stabilizer bar, or a tie rod, so damage may occur.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide to a steering stopper unit for a vehicle that may vary limit ranges of steering angle in order to prevent snow chains from interfering with a suspension system.

In an exemplary embodiment of the present invention, a steering stopper unit for vehicle may include a stopper that is disposed to a knuckle and a stopper bracket that is disposed to a lower arm correspondingly to the stopper and that is rotatably connected with a lower portion of the knuckle, the steering stopper unit having a stopper plate, which is hingedly engaged with an end portion of the stopper bracket, selectively contacts a forward side or a rearward side of the stopper bracket, and has a predetermined thickness, wherein the end portion of the stopper bracket is disposed higher than the stopper and the other end portion of the stopper bracket extends lower than the stopper when the stopper contacts a forward side of the stopper bracket The stopper plate may be hingedly engaged with the stopper bracket through a hinge block, wherein the stopper plate includes a first mounting groove to pivotally receive one end portion of the hinge block therein and wherein the stopper bracket includes a second mounting groove to pivotally receive the other end portion of the hinge block therein.

The stopper plate may be formed of a magnetic material.

The forward side and/or the rearward side of the stopper bracket may be formed of a magnetic material.

According to the exemplary embodiment of the present invention, the steering stopper unit for a vehicle may vary limited ranges of steering angle so that interference of snow chains with the suspension system may be prevented and damage may not occur.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
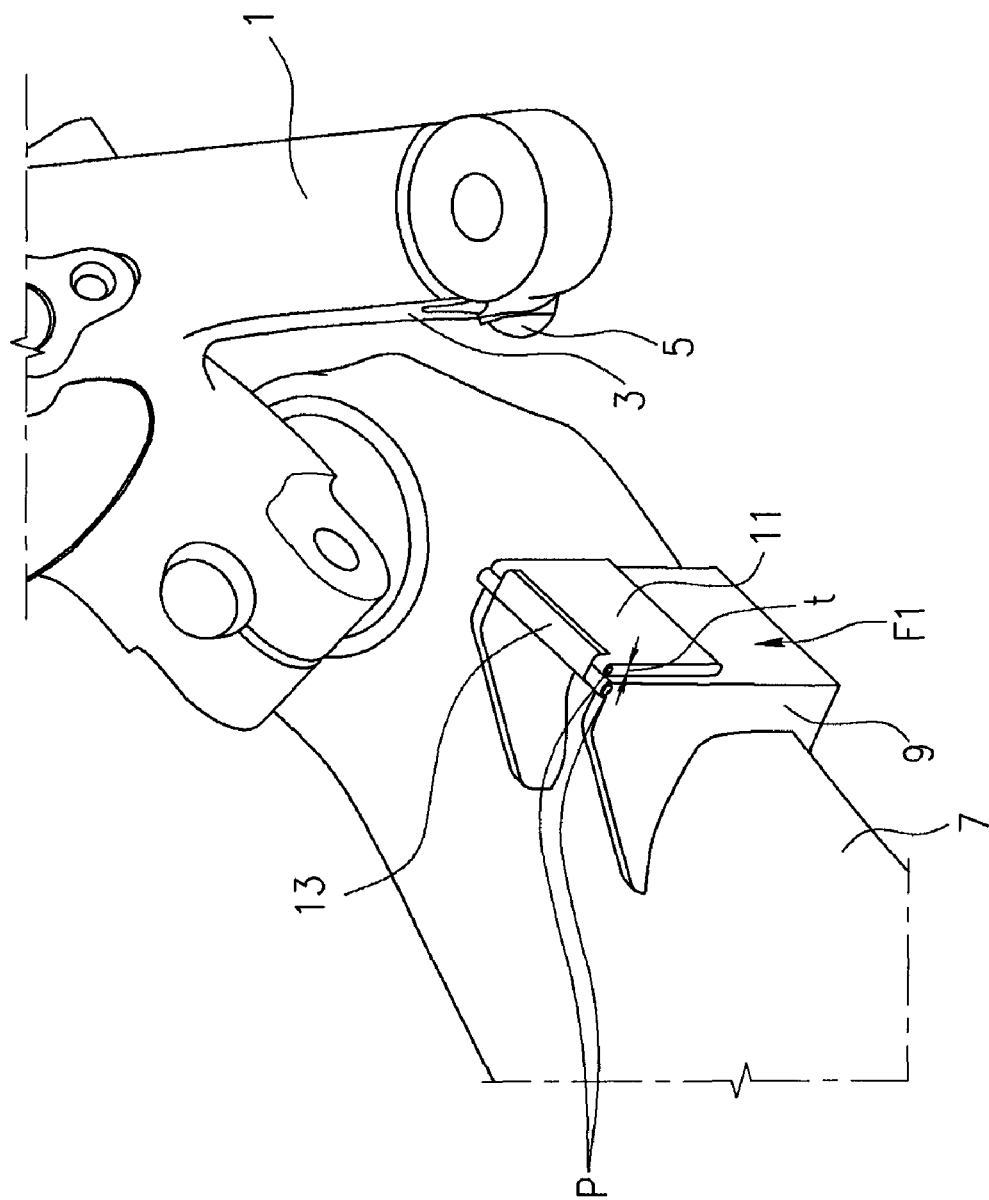
FIG. 1 is a perspective view of an exemplary steering stopper according to the present invention.
Figure 2:
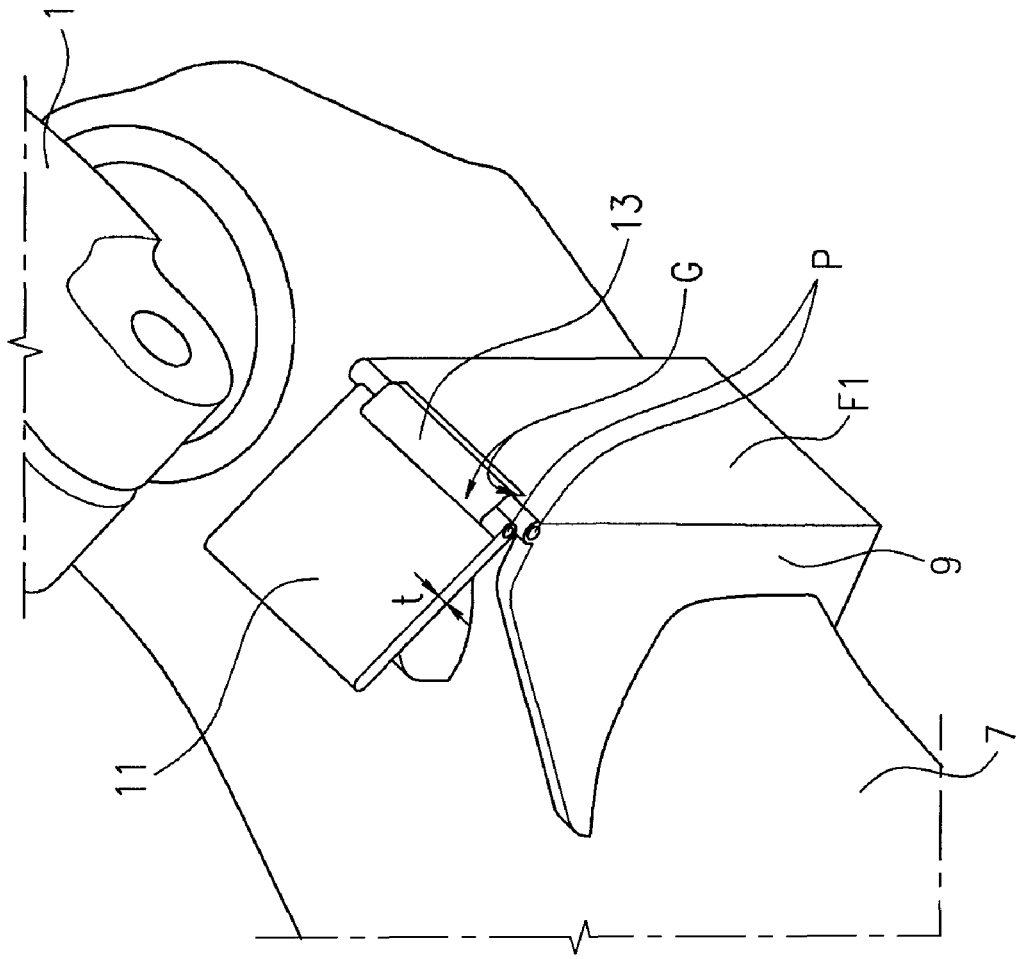
FIG. 2 is an enlarged perspective view of the steering stopper according to the present invention.

FIG. 1 is a perspective view of a steering stopper according to various embodiments of the present invention, and FIG. 2 is an enlarged perspective view of a steering stopper according to various embodiments of the present invention.

A steering stopper unit for a vehicle according to various embodiments of the present, as shown in FIG. 1 and FIG. 2, includes a protrusion 3, which is formed to a knuckle 1 to which a forward wheel (not shown) is mounted, and a stopper 5, which is mounted to an inside end of the protrusion 3.

A stopper bracket 9, corresponding to the stopper 5, is mounted to a lower arm 7 that is rotatably connected with a lower portion of the knuckle 1.

A stopper plate 11 having a predetermined thickness is hingedly engaged with an upper end of the stopper bracket 9, and selectively contacts a forward side of the stopper bracket F1 or a rearward side (not shown) of the stopper bracket F1.

The stopper plate 11 may have a predetermined thickness, and may be formed of a magnetic material. An end of the stopper plate 11 is hingedly engaged with the stopper bracket 9 through a hinge block 13, wherein a mounting groove G is formed to an end of the stopper plate 11, the hinge block 13 is inserted into the mounting groove G, and a hinge pin P connects the stopper plate 11 and the hinge block 13.

Also, a mounting groove G is formed to the upper end of the stopper bracket 9, the hinge block 13 is inserted into the mounting groove G, and a hinge pin P connects the stopper bracket 9 and the hinge block 13.

Figure 3:
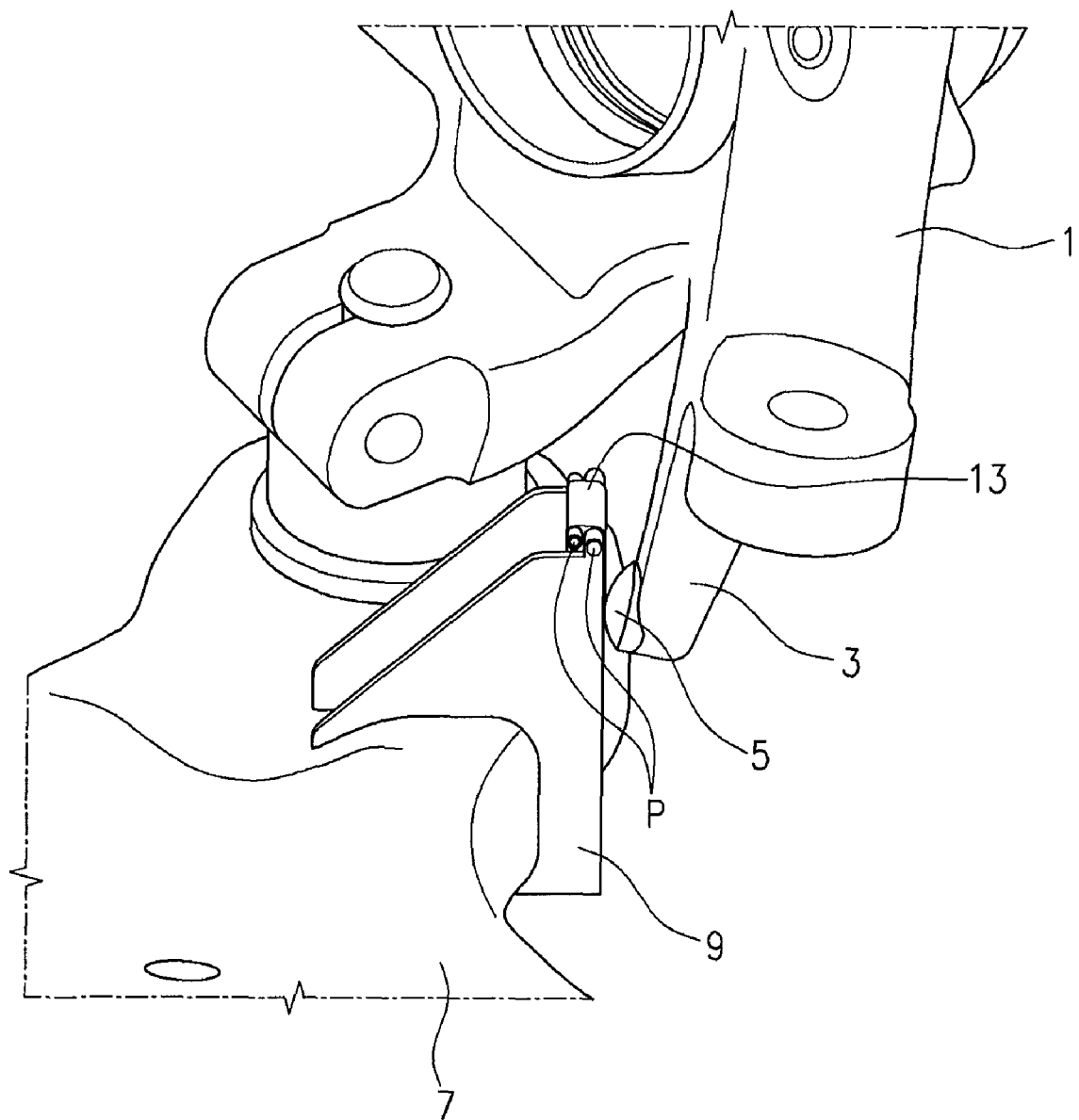
FIG. 3 and FIG. 4 are drawings showing exemplary operation states of the steering stopper of the present invention.

In a normal condition, as shown in FIG. 3, the stopper plate 11 is attached to the rearward side of the stopper bracket 9 so that a normal steering angle can be achieved.

In this case, the stopper plate 11 is a magnetic material so that the stopper bracket 9 can be fixed to the rearward side of the stopper bracket 9.

Figure 4:
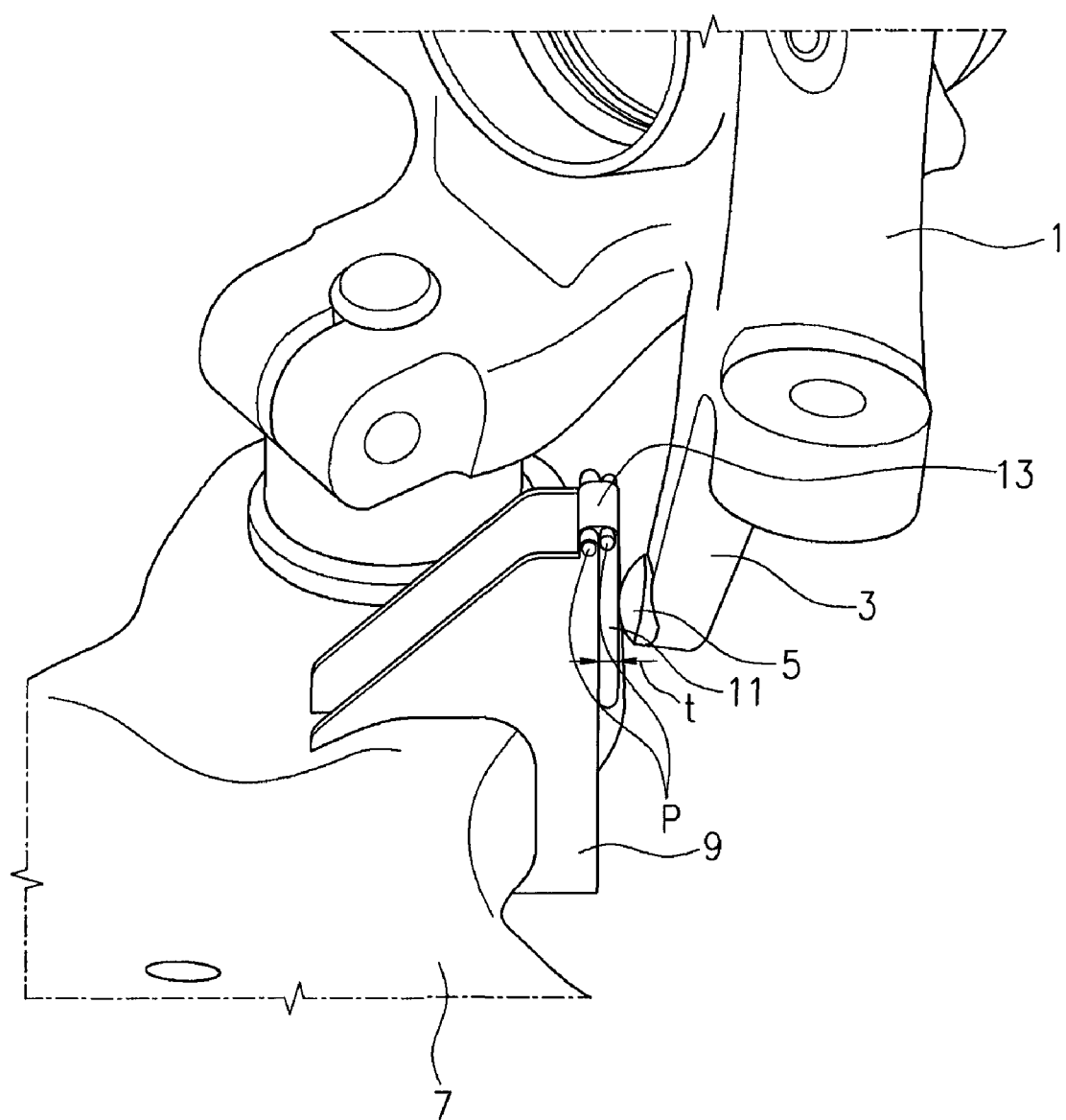
Figure 5:
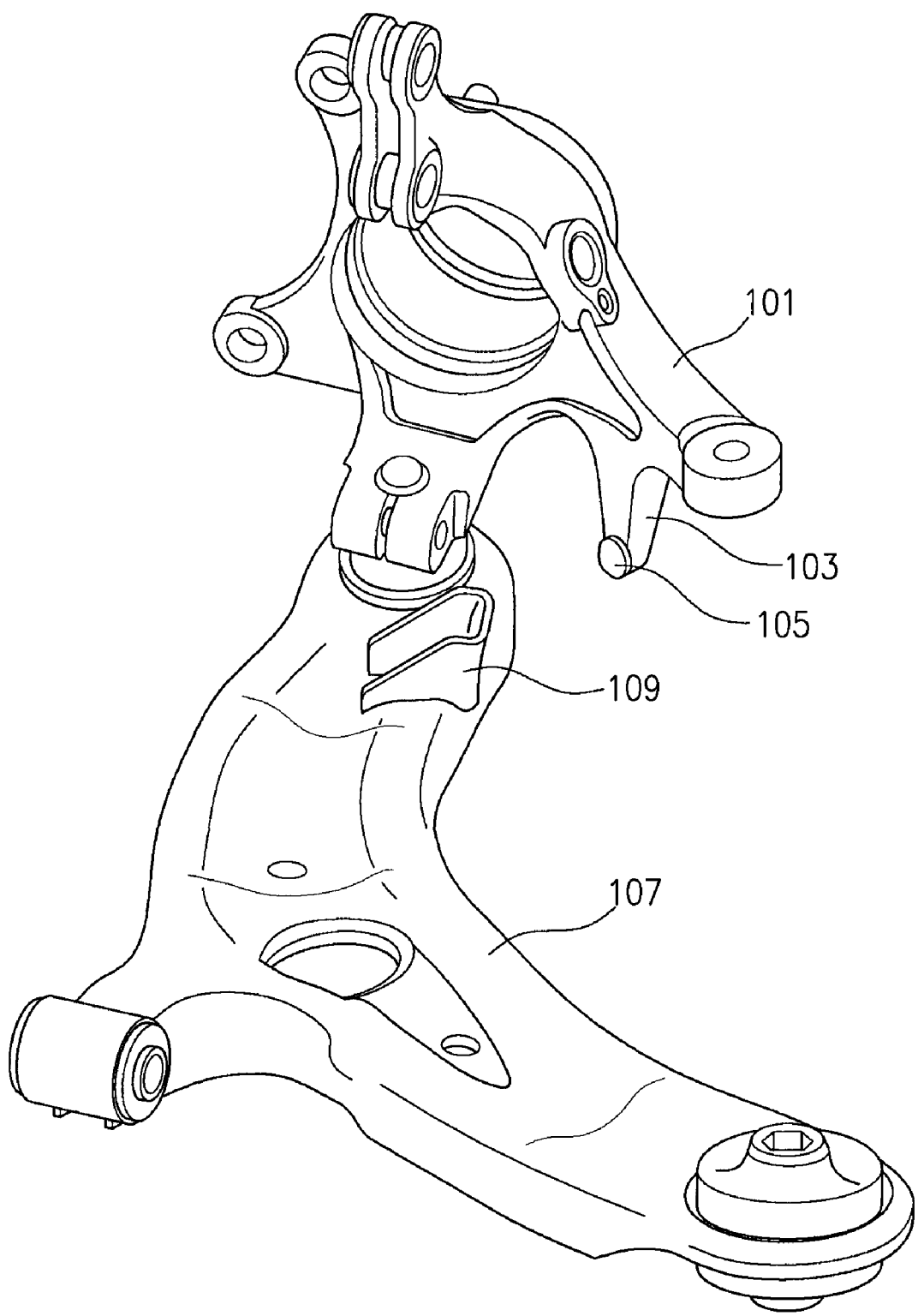
FIG. 5 is a perspective view of a knuckle and a lower arm of a conventional steering stopper.
Figure 6:
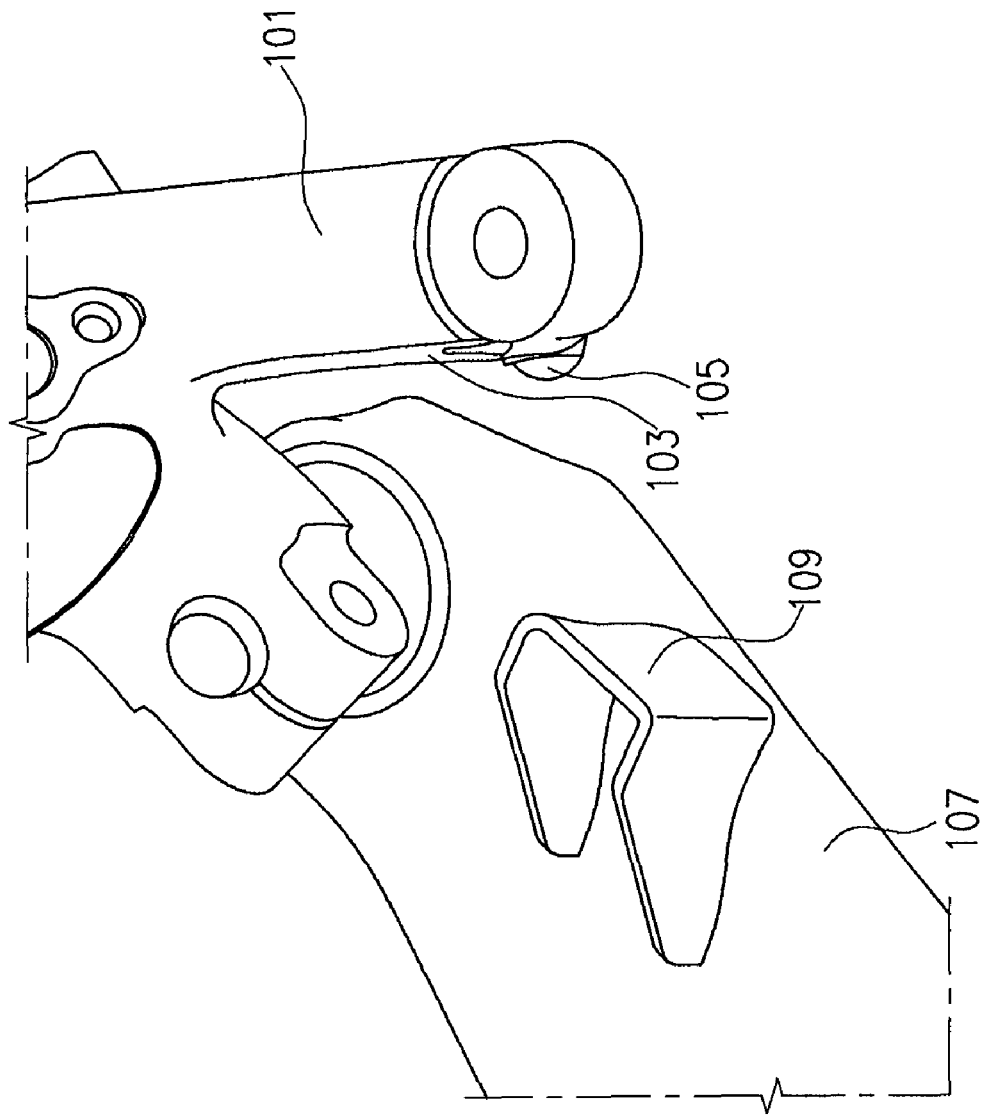
FIG. 6 is an enlarged perspective view of a conventional steering stopper.

When snow chains are mounted to the front wheel, the stopper plate 11, as shown in FIG. 4, is attached to the front side of the stopper bracket F1 so that movement of the stopper 5 of the knuckle 1 is limited by a thickness t of the stopper plate 11.

Thus, in the steering stopper unit according to various embodiments of the present, the stopper plate 11 can be selectively attached to the forward side or rearward side of the stopper bracket 9 and can vary limit ranges of the steering angle so that interference of snow chains with the suspension system can be prevented.

For convenience in explanation and accurate definition in the appended claims, the terms "forwards" and "rearwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A steering stopper unit for vehicle comprising:
    a stopper disposed to a knuckle and a stopper bracket that is disposed to a lower arm correspondingly to the stopper and that is rotatably connected with a lower portion of the knuckle; and
    a stopper plate, which is hingedly engaged with an end portion of the stopper bracket, selectively contacts a forward side or a rearward side of the stopper bracket, and has a predetermined thickness.

2. The steering stopper unit of claim 1, wherein the end portion of the stopper bracket is disposed higher than the stopper and the other end portion of the stopper bracket extends lower than the stopper when the stopper contacts a forward side of the stopper bracket.

3. The steering stopper unit of claim 1, wherein the stopper plate is hingedly engaged with the stopper bracket through a hinge block.

4. The steering stopper unit of claim 3, wherein the stopper plate includes a first mounting groove to pivotally receive one end portion of the hinge block therein.

5. The steering stopper unit of claim 4, wherein the stopper bracket includes a second mounting groove to pivotally receive the other end portion of the hinge block therein.

6. The steering stopper unit of claim 3, wherein the stopper plate includes a first mounting groove to pivotally receive one end portion of the hinge block therein and, wherein the stopper bracket includes a second mounting groove to pivotally receive the other end portion of the hinge block therein.

7. The steering stopper unit of claim 6, wherein the forward side and/or the rearward side of the stopper bracket is formed of a magnetic material.

8. The steering stopper unit of claim 1, wherein the stopper plate is formed of a magnetic material.

9. The steering stopper unit of claim 1, wherein the forward side and/or the rearward side of the stopper bracket is formed of a magnetic material.

* * * * *